Feb. 7, 1956          P. A. NOXON          2,733,879
TRIM TAB SERVO MOTOR CONTROL
Filed Dec. 31, 1947
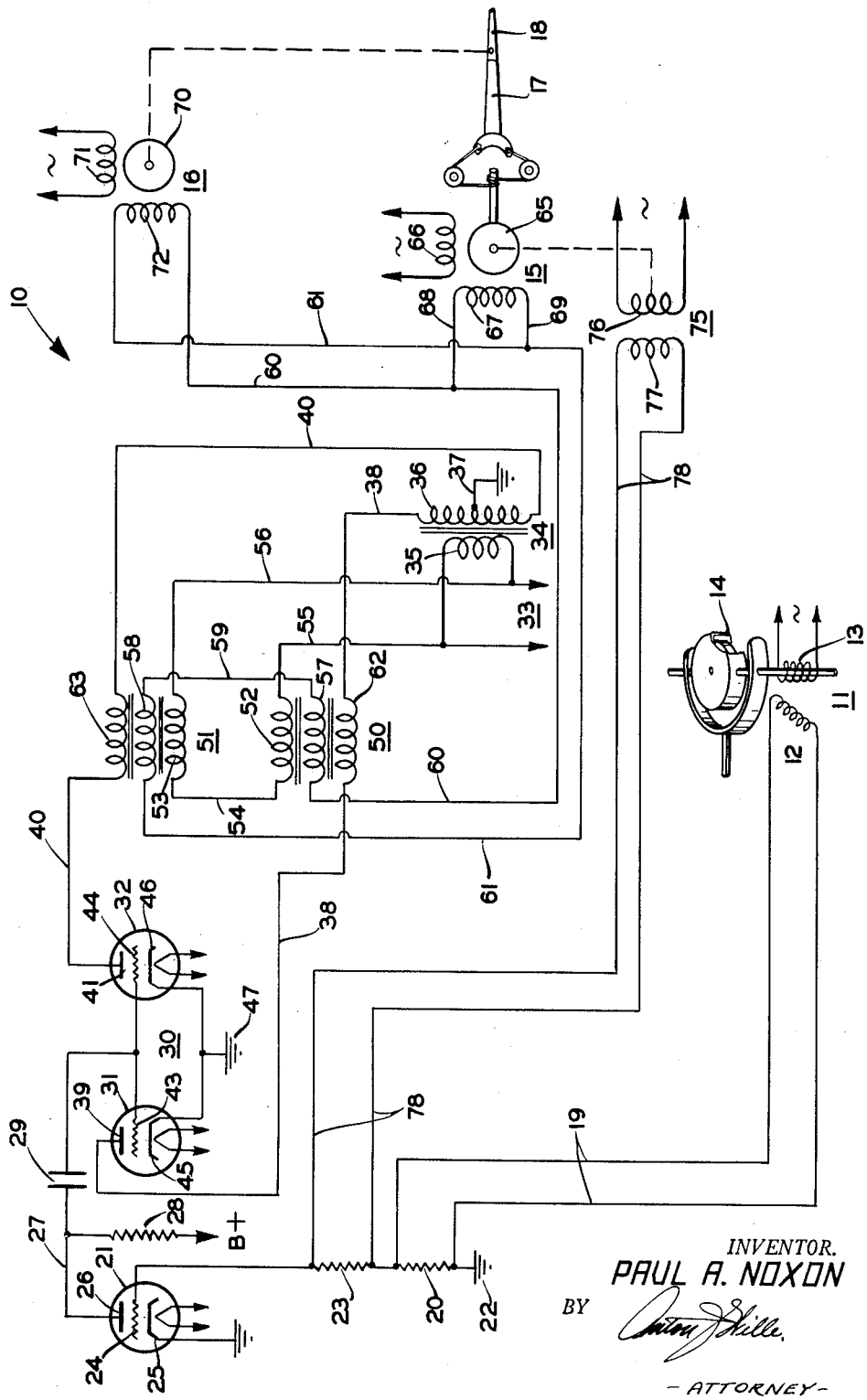
INVENTOR.
PAUL A. NOXON
BY
-ATTORNEY- United States Patent Office 2,733,879
Patented Feb. 7, 1956

2,733,879

TRIM TAB SERVO MOTOR CONTROL

Paul A. Noxon, Tenafly, N. J., assignor to Bendix Aviation Corporation, Teterboro, N. J., a corporation of Delaware Application December 31, 1947, Serial No. 795,065

9 Claims. (Cl. 244—77)

This invention relates to automatic pilot systems for aircraft, and more particularly to the control of a motor positioning an auxiliary flight surface in response to error signals developed in an automatic pilot system.

In controlling the level flight of an aircraft, shifts in the center of gravity of the craft and changes in wing loading will occur due to the movement of passengers about in the cabin, by the depletion of the engine fuel supply, or by other causes, which must be compensated for to enable the craft to maintain the desired attitude. Compensation for tail or nose heavy conditions of an aircraft are made by deflection of the elevator surfaces and/or the auxiliary or trim tab surfaces.

By changing the angle of attack of the elevator surface to compensate for the out-of-trim attitude of the craft, the loading on the elevator surface is increased and requires a torque to be applied which will maintain the primary flight surface in the required position. In manual flights, such torque is applied by the pilot through his controls. In flights controlled by automatic pilot systems, such torque requirements are placed on the servomotors moving these surfaces.

With the addition of secondary, or trim tab surfaces on the elevators, rudder and aileron, the necessary constant torque, or hinge moment may be supplied, so that the average force required of the pilot, human or automatic, can be reduced to zero, in spite of the out-of-trim condition existing in the corresponding axis.

It is, therefore, an object of my present invention to provide an auxiliary surface control for an automatic pilot system by which compensations are made for the changes in the center of gravity of the aircraft to maintain the craft in a level flight attitude.

Another object of my invention is to provide in an automatic pilot system a secondary servomotor control which will position the trim tab surfaces in response to the torque reqirements to the primary surfaces to maintain level flight attitude.

A further object of this invention is to provide in an automatic pilot system a secondary servomotor control which will deflect the trim tab surfaces to aid in the deflection of the primary surfaces to reduce the torque requirements of the system.

Still another object of this invention is to provide in an automatic pilot system a secondary servomotor control for deflecting the trim tab surfaces which may readily be added to existing automatic pilot systems, which shall be automatic and positive in its action, relatively inexpensive to manufacture, which shall have a large variety of applications, and yet be practical and efficient to a high degree in use.

Other objects of this invention will in part be obvious, and in part hereinafter pointed out.

The auxiliary servomotor control provided herein comprises a second servomotor to deflect the trim tab surfaces which is connected in parallel with the primary or elevator servomotor. The trim tab servomotor connections are oppositely made so that operation of the elevator motor in a clockwise direction will result in counterclockwise rotation of the trim tab motor. Thus the trim tab is deflected in an opposite direction from that in which the elevator surface is deflected.

In response to a displacement signal developed by the take-off device of the artificial horizon gyroscope due to a nose or tail heavy attitude of the aircraft, the elevator surface will be deflected to bring the craft back to its correct flight attitude. The trim tab servomotor will also operate at the same time to deflect the trim tabs. The deflection of the trim tabs being opposite to that of the elevators will assume a part of the loading thereby decreasing the torque required of the elevator servomotor.

A feedback signal developed by the operation of the elevator servo tends to offset the initiating displacement signal. Since the center of gravity of the craft has changed, a new angle of attack of the elevator is required to maintain the craft in level flight. The new angle of attack of the primary surface will increase the loading on such surface which will require a torque to be applied to maintain this new position. The residual signal in the control circuit supplies this torque to the elevator surface motor. The power thus supplied to the elevator servo is also supplied to the trim tab servo. The trim tab servo will thus be operated in response to the torque requirements of the primary servo to position the trim tabs. The continuing positioning of the trim tabs will decrease the loading of the elevator servo permitting the residual signal of the system to be wiped out. The power supplied then to both servomotors is cut-off, the trim tab being left in a position in which it may continuously react upon the aircraft to maintain the desired flight attitude.

Referring now to the single figure of the drawing forming a part of this specification, in which a schematic wiring diagram of one of the various possible illustrative embodiments of this invention is shown, the numeral 10 designates the elevator control circuit of an automatic pilot system similar to that disclosed in a copending application Serial No. 516,488 filed December 31, 1943, and now Patent No. 2,625,348, issued January 13, 1953. The circuit 10 comprises a source of pitch signal 11, herein illustrated as a take-off device having a secondary winding 12 and a primary winding 13 connected across a suitable source of alternating current supply and fixed to the pitch axis of an artificial horizon gyroscope 14; and two servomotors 15 and 16 to operate the elevator surface 17 and trim tab surface 18, respectively, of an aircraft in response to the pitch signal voltages of the take-off 11.

The secondary winding 12 of the take-off device is connected by leads 19 across a resistor 20 forming a part of the input circuit of a triode tube 21. The resistor 20 is grounded at one end, as at 22, and connected at the other end through a resistor 23 to the grid 24 of the tube 21. The indirectly heated cathode 25 of the tube is grounded, while the anode 26 is connected by lead 27 through a resistor 28 to B+ supply, and through a coupling condenser 29 to the input of a phase discriminating circuit 30.

A change in the attitude of the aircraft from normal level flight due to the movements of the passengers within the cabin, or to a change in loading as the engine fuel is consumed, or to other causes, will result in a signal voltage being induced in the secondary winding 12 of the take-off device 11. This signal voltage is applied across the resistor 20 and appears on the grid 24 of the triode 21. The tube 21 will amplify the signal voltage and impress the same as undulating direct current on the discriminator circuit 30.

The phase discriminator circuit 30 comprises two triode tubes 31 and 32 connected in push-pull arrangement to the plate circuit lead 27 and to a suitable source of A. C. supply 33 by way of a transformer 34. The transformer comprises a primary winding 35 and a secondary winding 36 which is center-tapped and grounded as at 37. One end of the secondary winding is connected by a lead 38 to the plate 39 of the tube 31, while the other end of the winding is connected by a lead 40 to the plate 41 of the tube 32. The grids 43 and 44 of the tubes 31 and 32, respectively, are connected to the plate circuit lead 27, while the respective cathodes 45 and 46 are grounded as at 47. The tubes 31 and 32 are biased to cut-off.

The voltages applied to the plates 39 and 41 of the two triodes are 180° out of phase. It will be apparent that the tube which operates upon the impression of a signal voltage on the grid thereof, is dependent upon the phase of the impressed signal voltage. Thus, in the case of a change in aircraft attitude in which the craft noses down, we may assume that tube 31 will be operated, while tube 32 operates when the craft is tail heavy.

Connected into the plate circuit lead 38 of tube 31 is a magnetic reactor 50, while a similar reactor 51 is connected into the lead 40 of the tube 32. Each of the magnetic reactors comprises a soft iron core (not shown) having primary windings 52 and 53 connected in series by a lead 54 and by leads 55, and 56 across the voltage source 33; and secondary windings 57 and 58 connectced in series opposed relation by a lead 59, the ends of the secondary windings being connected respectively to the output leads 60 and 61. Saturating windings 62 and 63 are also provided, being connected into the plate circuit leads 38 and 40, respectively.

When no displacement signal is induced in the winding 12 of the take-off device 11, the signal voltage impressed upon the grids 43 and 44 of the discriminator triodes is zero, and no plate current will flow. The network described will be balanced, the voltage induced in the secondary winding 57 being equal to, and opposite in phase to the voltage induced in the secondary winding 58. With the induced voltages equal and opposite, no current will flow in the output leads 60 and 61.

When a change in aircraft attitude occurs, a voltage will be induced in the winding 12 of the take-off device of the gyro vertical. This voltage is amplified by the triode 21 and impressed on the grids 43 and 44 of the discriminator 30. Depending upon the phase of the induced displacement signal, tube 31 or tube 32 will operate. If we assume a nose-heavy condition of the aircraft, the tube 31 will be operated to provide an undulating direct current through the saturating winding 62 of the reactor 50. The current in the winding 62 will saturate the core of the reactor. The alternating current induced in the secondary winding 57 is reduced by the saturated core, so that the balance heretofore had is destroyed, permitting a current to flow in the output leads 60 and 61. When tube 32 operates due to a tail-heavy attitude of the aircraft, the output of tube 32 will saturate the core of reactor 51 due to the current in the saturating windings 63. A current will again flow in the output leads 60, 61, this time opposite in phase to that flowing during the nose-heavy attitude of the aircraft.

The servomotor 15 operating the elevator surface 17 is a two phase induction motor provided with an armature 65 coupled in a suitable manner to the elevator 17, a fixed phase 66 connected across an alternating current supply, and a variable phase 67 connected by leads 68, 69 to the output leads 60, 61. The servomotor 16 is also a two phase induction motor having an armature 70 suitably coupled through a high gear ratio to the trim tab surface 18, a fixed phase 71 and a variable phase 72 connected across the output leads 60, 61.

As will hereinafter be more fully described, the current flowing in the output leads 60, 61 will operate the two servomotors 15 and 16 simultaneously to operate their respective flight surfaces. It should be noted that the variable phase 72 of the trim tab servomotor 16 is connected oppositely to the connection of the variable phase 67 of the elevator servomotor 15, indicating that when the elevator surface 17 is moved in a counterclockwise direction, the trim tab is moved in a clockwise direction, and vice versa.

The operation of tube 31 of the discriminator 30 due to a nose-heavy attitude of the aircraft will operate the servomotor 15 in a direction which will deflect the elevator surface 17 to lift the nose of the aircraft. The operation of the tube 32 due to a tail-heavy displacement signal will operate the servomotor 15 in an opposite direction to deflect the elevator to lower the nose of the aircraft to bring the same back to level flight attitude.

To provide dead-beat operation of the elevator servomotor 15 and the induced displacement signals, a followback signal is provided by means of a rotary inductive device or generator 75. The device 75 comprises a rotor winding 76 connected across a suitabe source of alternating current, and a stator winding 77 connected by leads 78 across the resistor 23 in the input circuit of the amplifier 21. The rotor winding 76 is suitably coupled to the armature 65 of the servomotor 15.

Operation of the elevator servomotor 15 in response to an error displacement signal will rotate the rotor winding 76. A signal voltage will be induced in the stator winding 77 which is impressed across the resistor 23 in oppositon to the displacement signal voltage appearing across the resistor 20, tending to reduce the displacement signal. The elevator surface meanwhile, responding to the displacement signal, tends to correct the attitude of the aircraft, further reducing the displacement signal. The follow-back signal becoming the stronger of the two, will reverse the operation of the servomotor 15 to return the elevator 17 to a position in which level flight will be maintained.

The displacement signal initiating the operation of the elevator servomotor 15 was caused by the change in the center of gravity of the aircraft brought about by a shifting of the loading. The operation of the servomotor in response to the signal changes the angle of attack of the elevator surface to offset the change in flight attitude, and in so doing, due to the lag in aircraft response to the elevator movement, slightly overruns the proper deflection angle. The feedback signal developed by the generator 75 tends to wipe out the displacement signal impressed on the amplifier circuit 10. Since a change in aircraft loading has occurred, the elevator surface must be left in a position which will maintain the required level flight attitude. This new position of the elevator surface is not the initial position of the elevator at the time the displacement signal was developed. The new position of the elevator would indicate that the loading of this surface has been altered due to the change in the angle of attack thereof. The loading of the aircraft surface requires that a torque be developed by the servomotor 15 to maintain the surface in its proper position, just as in the case of manual flight control where the pilot must maintain a physical force on the surface controls to hold the flight surfaces in the required position.

The torque required of the servomotor 15 to maintain the elevator surface in the required position is supplied by the power leads 60, 61 due to the residual signal remaining in the system. The amplified residual signal, or power to the servomotor, is insufficient to operate the motor 15 in the usual sense, but is sufficient to supply the required torque to maintain the elevator surface in its new position.

The servomotor 16 operating the trim tab surface 18 is provided to eliminate the torque requirements of the servomotor 15. The trim tab servomotor 16 is not provided with a feedback signal generator as was the case of the servomotor 15. The operation of the trim tab servo is determined by the power supplied by the leads 60, 61. The trim tab motor 16 will operate to move the tab surface 18 as long as there is power being supplied to the elevator servomotor. Thus the tab surface 18 will be deflected to reduce the loading of the elevator surface, permitting the elevator surface to be repositioned by the servomotor 15 until the residual signal in the system is wiped out. The trim tab then will react continuously on the craft to maintain the craft in level flight.

While I have described the above invention as being applied to the elevator trim tab surface, it will be readily appreciated by those versed in the art that other auxiliary flight surfaces may be operated in a similar manner, either in connection with the elevator channel as described, or in connection with the rudder or aileron channels of an automatic pilot system.

It will thus be seen that there is provided an auxiliary surface control for an automatic pilot in which the several objects of this invention are achieved, and which is well adapted to meet the conditions of practical use.

As various embodiments may be made of the above invention, and as various changes may be made in the embodiment described, it will be understood that all matter herein set forth, or shown in the accompanying drawing, is to be interpreted as illustrative and not in a limiting sense.

Having thus described my invention, I claim as new and desire to secure by Letters Patent:

1. In an automatic pilot for aircraft having a primary control surface and a secondary control surface, the combination comprising a single source of error signal voltage responsive to craft deviation from a desired attitude, a servomotor connected for operation in accordance with said error signals to position said primary control surface to return the craft to the desired attitude, and a second servomotor connected for operation in accordance with said error signals in a manner reversely of the operation of said first servomotor to position said secondary control surface oppositely to the positioning of said primary control surface thereby reducing the loading of said primary surface.

2. In an automatic pilot system for aircraft having a primary control surface and a secondary control surface, the combination of a single source of error signal voltage responsive to craft deviation from a desired attitude, a servomotor connected for operation in accordance with said error signals to position said primary control surface, means for developing a follow-up voltage responsive to servomotor operation tending to wipe out the error signals and to return the primary control surface to a position where the desired craft attitude is maintained, and a second servomotor connected for operation in accordance with said error signals in a manner reversely of said first servomotor to position the secondary control surface to reduce the torque requirements of said first motor.

3. In an automatic pilot system for aircraft having a primary control surface and a secondary control surface, the combination comprising a single source of error signal voltage responsive to craft deviation from a desired attitude, a servomotor connected in one manner for operation by said source to position said primary control surface, and a servomotor connected in a different manner for operation in a reverse direction by said source to position said secondary control surface to return said craft to the desired attitude.

4. In an automatic pilot system for aircraft having a primary control surface and a secondary control surface, the combination comprising a single source of error signal voltage responsive to craft deviation from a desired attitude, a servomotor to position said primary control surface connected for operation in accordance with said signal source, and a servomotor to position said secondary control surface oppositely to the positioning of said primary control surface connected in parallel with said first motor to return said craft to the desired attitude, said second servomotor also being connected to said signal source in a manner reversely of said first servomotor.

5. In an automatic pilot system for aircraft having a primary control surface and a secondary control surface, the combination comprising a single source of error signal voltage responsive to craft deviation from a desired attitude, a balanced inductive device adapted to be unbalanced by the error signals of said source, a servomotor connected to said device for positioning the primary control surface, and a servomotor connected to said device in a manner reversely of said first servomotor for positioning the secondary control surface, said second servomotor being also connected in parallel with said first motor.

6. In an automatic pilot for aircraft having a primary control surface and a secondary control surface, the combination comprising a source of error signal voltage responsive to craft deviation from a desired position, normally balanced voltage means adapted to be unbalanced by the error signal voltage of said source, a servomotor connected to said voltage means and operable thereby in response to unbalance thereof for positioning one of said control surfaces, and a second servomotor connected to said voltage means in a manner reversely of said first servomotor and operable by said voltage means in response to unbalance thereof for positioning the other of said control surfaces.

7. An automatic pilot system for an aircraft having a primary control surface and a secondary control surface, comprising a source of error signal voltage responsive to craft deviation from a desired attitude, a balanced inductive device adapted to be unbalanced by said error signal, a first servomotor for positioning said primary control surface, a second servomotor for positioning said secondary control surface, each of said servomotors having fixed and variable phase windings, said fixed phase windings being continuously energized, said variable phase windings being connected to said inductive device and energized upon an unbalance thereof, said last named connections being oppositely made so that the operation of said first servomotor in a clockwise direction will result in the operation of said second servomotor in a counterclockwise direction, and a follow-up signal generator operable by said first servomotor for developing a signal tending to balance and unbalance in an opposite direction said inductive device to operate said motors to position said primary and secondary control surfaces to restore the desired attitude of the craft.

8. An automatic pilot system for aircraft having a primary control surface and a secondary control surface, comprising a source of error signal voltage responsive to craft deviation from a desired attitude, a balanced inductive device adapted to be unbalanced by said error signal, a first servomotor for positioning said primary control surface, and a second servomotor for positioning said secondary control surface, said servomotors each having fixed and variable phase field windings, said fixed phase windings being continuously energized, said variable phase windings being reversely connected to said inductive device and energized upon an unbalance thereof, said unbalance being due to a residual signal in said system and energizing said variable phase windings in accordance with the torque requirements of said first servomotor to position said primary surface to maintain the desired craft attitude, said unbalance operating said second servomotor to position said secondary surface to relieve the torque of said first servomotor.

9. An automatic pilot system for controlling the primary and secondary control surfaces of any one of the three axes of attitude control of an aircraft, comprising means for developing a signal voltage upon deviation of the craft from a desired flight attitude, a balanced inductive network tending to be unbalanced by said signal voltage, a first servomotor operable in response to the unbalance of said network to move said primary control surface to reestablish the desired flight attitude, said first servomotor having a fixed phase winding continuously energized and a variable phase winding connected to said network, means for developing a primary control surface displacement signal voltage upon operation of said servomotor tending to rebalance said network, the difference between the actual and required displacement causing an unbalance of said network, said first servomotor in response to said network unbalance providing the required torque to position and maintain in position said primary surface, and a second servomotor having a fixed phase winding continuously energized and a variable phase winding connected reversely in parallel with said first motor, said second servomotor being operable in accordance with said network unbalance to position said secondary surface in a direction opposite to the direction in which said primary surface is positioned by said first servomotor.

References Cited in the file of this patent

UNITED STATES PATENTS

| | | |
|---|---|---|
| 2,003,930 | Fischel | June 4, 1935 |
| 2,143,139 | Carlson et al. | Jan. 10, 1939 |
| 2,183,932 | Carlson | Dec. 19, 1939 |
| 2,232,982 | Tank | Feb. 25, 1941 |
| 2,381,840 | Schaeffer et al. | Aug. 7, 1945 |
| 2,392,381 | Hanson et al. | Jan. 8, 1946 |
| 2,401,168 | Kronenberger | May 28, 1946 |
| 2,471,637 | MacCallum | May 31, 1949 |
| 2,568,719 | Curry, Jr. | Sept. 25, 1951 |
| 2,625,348 | Noxon et al. | Jan. 13, 1953 |